United States Patent

[11] 3,628,674

| [72] | Inventors | Kunio Koike;<br>Akio Mito, both of Kanagawa; Masayasu Dezaki, Tokyo, all of Japan |
|---|---|---|
| [21] | Appl. No. | 73,315 |
| [22] | Filed | Sept. 18, 1970 |
| [45] | Patented | Dec. 21, 1971 |
| [73] | Assignee | Kabushiki Kaisha Tokyo Keiki Seizosho (Tokyo Keiki Seizosho Co., Ltd.) Tokyo, Japan |
| [32] | Priority | Sept. 24, 1969 |
| [33] | | Japan |
| [31] | | 44/75948 |

[54] INDUSTRIAL ROBOT
5 Claims, 3 Drawing Figs.

[52] U.S. Cl. .................................................. 214/1 BD, 214/147 T
[51] Int. Cl. .................................................. B66c 1/00
[50] Field of Search ............................................. 214/1 BB, 1 BC, 1 BD, 1 BH, 1 BV, 147 T, 147 R

[56] References Cited
UNITED STATES PATENTS

| 3,075,651 | 1/1963 | Kaden .......................... | 214/1 BB |

FOREIGN PATENTS

| 641,423 | 4/1964 | Belgium ....................... | 214/1 BH |

*Primary Examiner*—Gerald M. Forlenza
*Assistant Examiner*—George F. Abraham
*Attorney*—Hill, Sherman, Meroni, Gross & Simpson ABSTRACT: An industrial robot comprising a truck, an arm support base, an arm mounted thereon, a clamp for a load to be carried, a turning device for the arm, and a pump driving the arm and turning device through directional valves, in which a device is provided for detecting a force applied to the arm and a sliding device is provided for sliding the arm support base, whereby the detecting device detects the force over a predetermined value to cause the sliding device to move the arm support base toward the load.

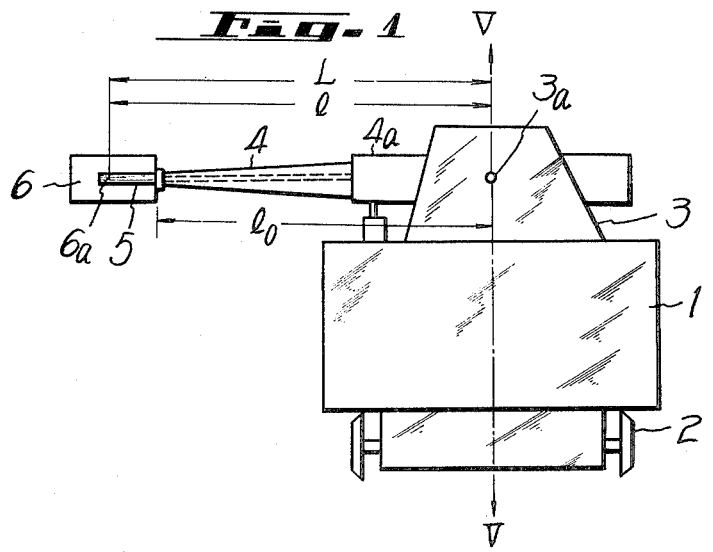
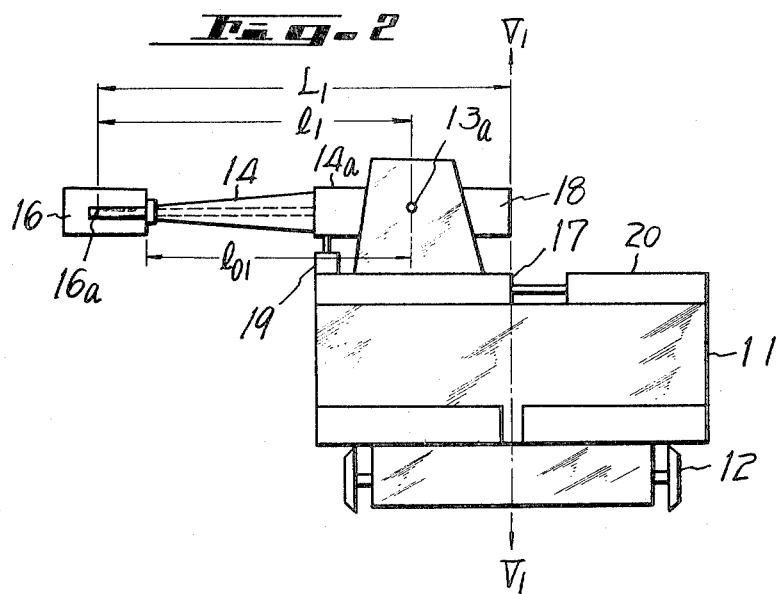

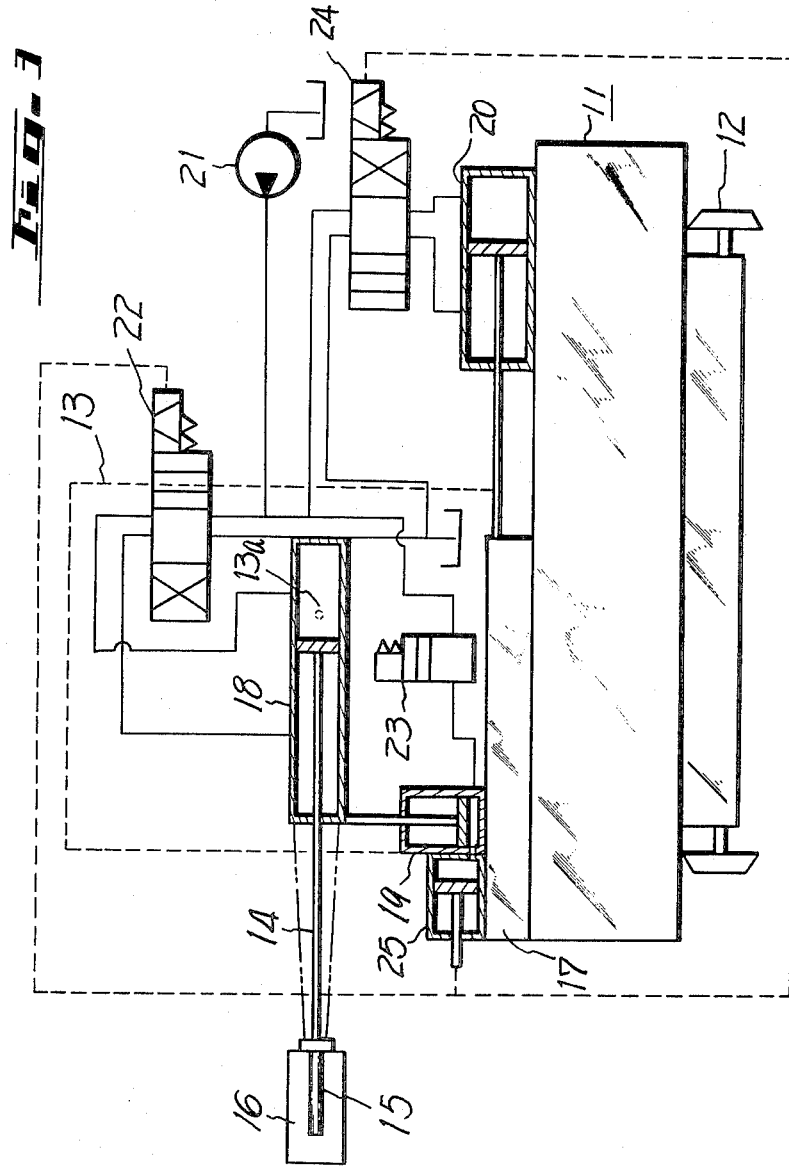

INDUSTRIAL ROBOT

BACKGROUND OF THE INVENTION

1. Field of the Invention

This invention relates to an industrial robot adapted to shift the fulcrum of the support arm of the robot toward a load to be carried so as to enable carriage of a far heavier load relative to the tare of the robot than conventional types of industrial robots.

2. Description of the Prior Art

In order to increase the weight of a load which can be carried by an industrial robot of the type carrying the load picked up and held by a clamp attached to the top end of an arm capable of expansion and contraction, the strength of the arm holding the load and the fulcrum supporting the arm must be increased in proportion to the product of the weight of the load and the length of the arm between the fulcrum and the center of gravity of the load. An increase in the strength of the arm and the fulcrum causes an increase in the weight of the arm and the fulcrum support portion and this inevitably requires reinforcement of respective parts of the industrial robot. Hence, this results in an increase in the overall weight of the latter and decreases the ratio in weight of the load capable of being carried to the weight of the industrial robot, thus decreasing efficiency.

SUMMARY OF THE INVENTION

The present invention has for its object the provision of an industrial robot which is free from the aforementioned defect encountered in the prior art. The present inventors found that the cause of the defect of the conventional industrial robot resided in that the supporting point of the arm was always fixed at the center of the truck and they have succeeded in removing the defect, taking note of the fact that when a heavy load is lifted by human power the center of gravity of the human body is shifted toward the load by shifting the waist of the human.

Namely, another object of the present invention is to provide an industrial robot which has an device according to which the supporting point of the arm is caused to approach a heavy load to reduce the length of the arm by a length substantially equal to the distance of the movement of the arm to thereby effectively increase the ratio of the weight of the load to be carried to that of the industrial robot.

BRIEF DESCRIPTION OF THE DRAWINGS

FIG. 1 is a side view of a conventional industrial robot;

FIG. 2 is a side view of an industrial robot produced according to this invention; and FIG. 3 is an enlarged side view, partly in section, of the industrial robot of FIG. 2, for explaining its operation.

DESCRIPTION OF THE PREFERRED EMBODIMENTS

With reference to FIG. 1 a description will be given first of a conventional robot. In the figure reference numeral 1 indicates a truck, which has wheels 2 at its underside and has mounted thereon an arm support base 3 substantially at its center. The base 4a of the arm 4 is rotatably journaled to the fulcrum or supporting point 3a of the arm support base 3 and the top end of the arm 4 has mounted thereon a clamp 5 for holding a load 6 to be carried. The arm 4 is adapted to be pulled into and pushed out from the base 4a by an oil-hydraulic cylinder or the like so that the length of the arm 4 may be freely adjusted. The supporting point 3a of the arm support base 3 is located on or near a vertical line V–V passing through the center of gravity of the industrial robot. If the maximum weight of a load which can be carried by the robot is taken as W, the distance from the supporting point 3a to the center of gravity 6a of the load 6 is taken as $l$ and the maximum allowable length of the arm 4 is taken as $l_0$, the strength of the arm 4, the arm support base 3 and the truck 1 must be determined in proportion to a torque W1 due to the load 6 and the weight of each part is also dependent upon the value of the torque W1. Since the amount of deflection of the load 6 in a vertical direction is limited within a certain range, it is required that even when extended to the fullest extent, the arm 4 is strong enough to support the load carried at its top end, namely the amount of deflection of the arm 4 due to the torque W1 is small, that when supporting the load 6 and the arm 4, the arm support base 3 is strong enough to substantially prevent deflection of the position of the load 6 and that when supporting the load 6, the arm 4 and the arm support base 3, the truck 1 is strong enough to prevent the load 6 from sagging in excess of its limit. This inevitably causes an increase in the weight of the robot. Further, an increase in the weight of each part of the robot requires great driving force therefor. In such a conventional industrial robot as depicted in FIG. 1 the ratio of the weight of a load capable of being carried to the weight of the robot is as low as 3 to 7 percent and this is extremely low, as compared with the ratio of the weight of a load capable of being carried by a man to his weight.

Referring now to FIGS. 2 and 3, one example of this invention will hereinafter be described in detail. Reference numeral 11 indicates a truck, 12 wheels supporting the truck 11, 13 an arm support base and 14 an arm designed so that its base 14a is journaled to the arm support base 13 at its supporting point 13a and the arm 14 freely comes in and out from a base 14a. Reference numeral 15 designates a clamp attached to the top or free end of the arm 14, 16 a load to be carried (which is shown to be held by the clamp 15 in the illustrated example), 16a the center of gravity of the load 16 and 17 a sliding base which has mounted thereon the arm support base 13 and is slidably mounted on the truck 11 to approach and move away from the load 16. Reference numeral 18 indicates an actuator for expanding and contracting the arm 14, its cylinder and piston rod respectively corresponding to the aforementioned base 14a and arm 14. Reference numeral 19 identifies an actuator for turning the arm 14 about the supporting point 13a in a vertical direction and 20 an actuator which is used to move the sliding base 17 backward and forward. Reference numeral 21 designates an oil-hydraulic pump for feeding oil to the actuators 18, 19 and 20 to drive them, 22 a directional control valve which is inserted to an oil path between the oil-hydraulic pump 21 and the actuator 18 for controlling the latter, 23 a directional valve which is inserted in an oil path between the oil-hydraulic pump 21 and the actuator 19 for controlling the latter and 24 a directional valve which is similarly inserted in an oil path between the oil-hydraulic pump 21 and the actuator 20 for controlling the latter. In the present example the aforementioned directional valves 22, 23 and 24 are all electromagnetic valves. Reference numeral 25 indicates a pressure switch which detects a load imparted to the actuator 19 in the form of hydraulic pressure, converts it into an electric signal and controls the directional valves 22 and 24 with the electric signal.

With such an arrangement, in the case where the load 16 is held by the clamp 15 attached to the top end of the arm 14 in its extended condition and the arm 14 is lifted by the actuator 19, a pressurized oil is supplied from the oil-hydraulic pump 21 to the actuator 19 through the directional valve 23 to thereby raise the hydraulic pressure in the actuator 19. When the hydraulic pressure in the actuator 19 rises in excess of a predetermined value, the pressure switch 25 associated with the actuator 19 operates to concurrently actuate the directional valves 22 and 24, by which the actuator 18 is operated to reduce the length of the arm 14. While, the actuator 20 is operated to move the sliding base 17 on the truck 11 toward the load 16 by a distance substantially equal to the reduced length of the actuator 18, namely that of the arm 14 and then the actuator 20 stops.

Let it be assumed that the maximum weight of a load capable of being carried by the present industrial robot is W, that the distance between the supporting point 13a and the center of gravity 16a of the load 16 is $l_1$, that the maximum permissible length of the arm 14 is $l_{0_l}$ and that the distance between the center of gravity of truck 11 (which lies on the vertical line $V_1-V_{1a}'$) and that of the load 16 is $L_l$. When only the sliding base 17 has approached the load 16, the distance $L_1$ is constant but in the present invention when the sliding base 17 is slid toward the load 16 the arm 14 is reduced in length by the actuator 18, so that the distance $l_l$ is decreased. Namely, the supporting point 13a of the arm 14 approaches the load 16. Accordingly, the torque $l_lW$ imparted by the load 16 to the arm support base 13 becomes smaller than that obtainable with the conventional industrial robot depicted in FIG. 1 and consequently the arm 14 can be reduced both in strength and in weight. For the same reasons, the arm support base 13 and truck 11 can also be reduced in strength and in weight to thereby permit the reductions of the overall weight of the industrial robot and the driving force for its respective parts. As a result of this, the ratio of the weight of the load to be carried to that of the robot rises as high as about 13 percent.

Although the respective parts are driven by hydraulic pressure in the foregoing, it is needless to say that the same results can be obtained by driving them electrically with motors or mechanically with racks and pinions.

Thus, the industrial robot of this invention is capable of carrying far heavier loads, as compared with the conventional industrial robot of the same weight as the robot of this invention, and the industrial robot of the present invention is simple in construction and easy to handle and enables the shortening of the time for carriage and the reduction of the cost therefor due to high working efficiency.

It will be apparent that many modifications and variations may be effected without departing from the scope of the novel concepts of this invention.

We claim as our invention:

1. An industrial robot comprising a truck, an arm support base disposed on said truck, an arm means rotatably fixed to said arm support base, a clamp fixed to said arm means at its one end, a means for turning said arm about its fulcrum, and an oil-hydraulic pump for driving said arm and turning means through directional valves respectively, characterized in that a detecting means is provided for detecting a force applied to said arm means by the weight of the object being carried and a sliding means is provided for sliding said arm support base, whereby when the force applied to said arm means exceeds a predetermined value said sliding means operates to shift said arm support base toward a load to be carried.

2. An industrial robot as claimed in claim 1, wherein said sliding means consists of a sliding base disposed between said arm support base and said truck and an actuator for driving said sliding base.

3. An industrial robot as claimed in claim 1, wherein said detecting means is a pressure switch which is provided in connection with said turning means.

4. An industrial robot as claimed in claim 1, wherein a directional valve is inserted between said oil-hydraulic pump and said sliding means.

5. An industrial robot as claimed in claim 4, wherein a directional valve is inserted between said oil-hydraulic pump and said arm means, each directional valve is controlled in its actuation by said force detecting means to thereby move said load toward said arm support base and also said arm support base toward said load when said turning means is driven by said oil-hydraulic pump and the force being applied to said arm means exceeds said predetermined value.

* * * * *